W. L. HERRON.
BLOWPIPE.
APPLICATION FILED APR. 21, 1919.
1,412,243.
Patented Apr. 11, 1922.
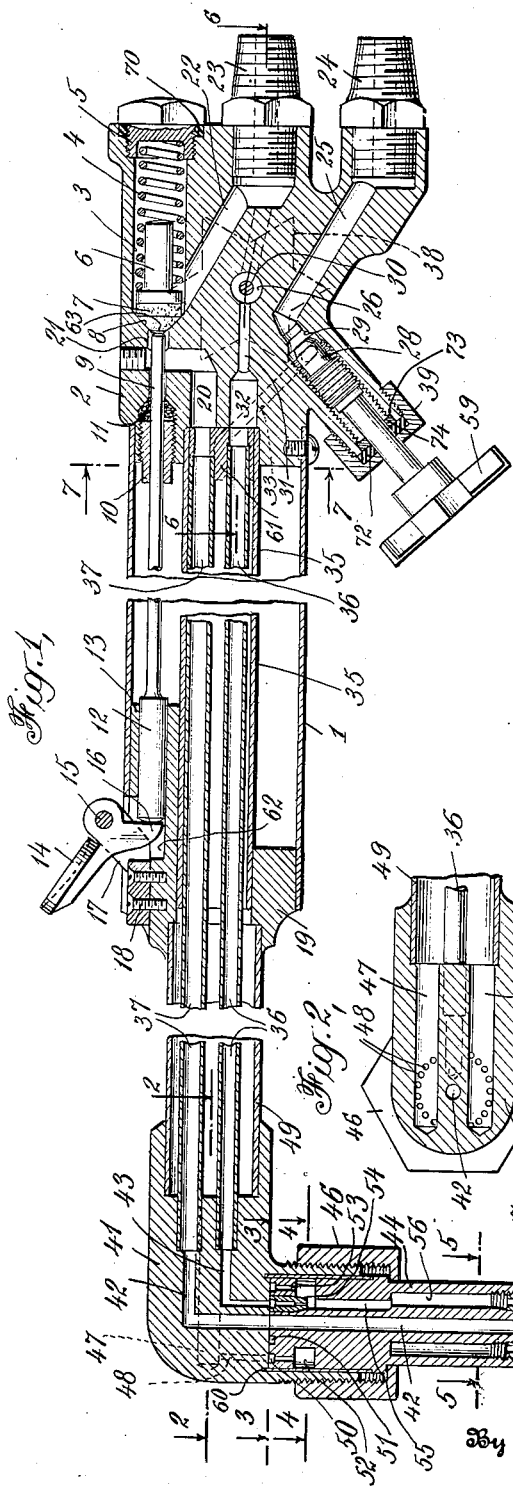
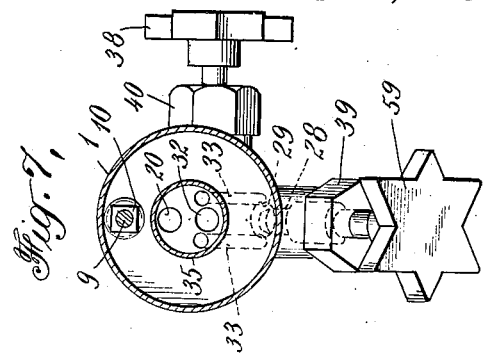
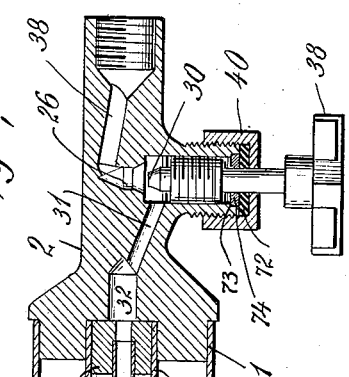
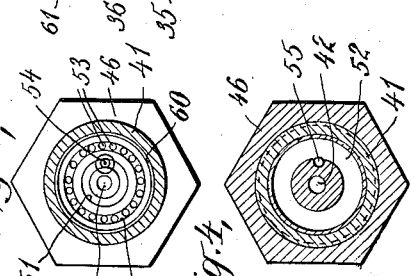
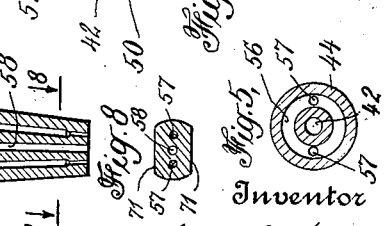
Inventor
William L. Herron
By his Attorney
Harry H. Duncan

UNITED STATES PATENT OFFICE.

WILLIAM L. HERRON, OF HARTFORD, CONNECTICUT, ASSIGNOR, BY MESNE ASSIGNMENTS, TO CARBIC MANUFACTURING COMPANY, OF DULUTH, MINNESOTA, A CORPORATION OF MINNESOTA.

BLOWPIPE.

1,412,243.  Specification of Letters Patent.  Patented Apr. 11, 1922.

Application filed April 21, 1919. Serial No. 291,474.

*To all whom it may concern:*

Be it known that I, WILLIAM L. HERRON, a citizen of the United States, resident of Hartford, county of Hartford, State of Connecticut, have made a certain new and useful Invention Relating to Blowpipes, of which the following is a specification, taken in connection with the accompanying drawing, which forms part of the same.

This invention relates especially to cutting blowpipes adapted for oxy-acetylene cutting and in which the shut-off valve controlling the oxygen cutting jet is arranged with an actuating thumb piece conveniently located in the handle of the torch or blowpipe so that it readily keeps open this cutting valve which may advantageously be formed with an oxygen resisting rubber facing. The replaceable cutting tip is preferably formed with two heating conduits one on each side of the central cutting passage or conduit in the tip end, these heating conduits communicating with a mixing chamber receiving the oxygen and acetylene or other heating gas employed for this purpose which may be effectively mixed by injector action so that the acetylene may be supplied at relatively low pressure and more or less drawn into the mixing passage and chamber by the higher pressure heating jet of oxygen.

In the accompanying drawing showing in a somewhat diagrammatic way an illustrative embodiment of this invention.

Fig. 1 is a vertical longitudinal section through an illustrative blowpipe.

Figs. 2, 3, 4 and 5 are transverse sectional views through the head and tip taken along the lines 2—2, 3—3, 4—4 and 5—5 respectively of Fig. 1.

Fig. 6 is a detail transverse section taken substantially along the line 6—6 of Fig. 1.

Fig. 7 is another transverse detail section along the line 7—7 of Fig. 1; and

Fig. 8 is a sectional detail of the tip end taken substantially along the line 8—8 of Fig. 1.

The blowpipe may be formed of any desired or suitable material and may comprise the tubular stem 49 of brass or other suitable metal soldered or otherwise secured to the head 41 which may be made of cast brass or the like and support the cutting or welding tip in any desired way. If desired the junction member or ring 19 may be secured to the tubular stem 49 at its other end and may support the hollow handle 1 removably held in place as by attaching screws indicated holding it upon the connector member 2 in which the adjusting and control valves may be arranged.

These valves may comprise the conical or needle adjusting valve 28 to control the acetylene or other heating gas supplied to the passage 25 by the coupling 24. This valve may cooperate with a conical or other seat 29 and may be formed with an enlarged threaded body 78 engaging a threaded hole in the connector member so as to give a fine adjustment between this valve and its seat as the valve handle 59 is turned. A tight joint may be secured between this valve stem and the connector member by the use of a threaded packing gland 39 within which a compressible packing, such as 72, may be arranged between the gland or cap and the metallic packing washer 74 located in an annular recess 73 in the end of the threaded hole with which the valve body cooperates. In this way the amount of acetylene or other heating gas supplied to the torch head may be accurately regulated and as indicated this gas may pass through one or more passages 33 to any suitable conduit or channel such as the tube 35 mounted in the connector member and junction member 19 so as to deliver this heating gas to the tubular stem 49. The oxygen from a similar gas reservoir or container may be led to the coupling 23 so as to pass through the passage 88 to a similar regulating valve 30 controlling the valve seat 26 as is indicated more in detail in Fig. 6. This valve has a similar packing gland 40 and other cooperating elements so that the operation of the star shaped or double triangular valve handle 38 accurately adjusts the effective area of the passage between the conical or needle valve 30 and its seat so as to correspondingly regulate the amount of gas passing through the passage 31, 32 and the communicating conduit 36. This conduit may as indicated in Figs. 1 and 6 be mounted at its rear end in a plug or member within one end of the pipe or tubular passage 35 while the other end of this conduit may be soldered or otherwise secured within the head 41 so as to communicate with the oxygen passage 43 therein leading to the detachable tip on the blowpipe.

From the oxygen coupling 23 extends another oxygen passage 22 controlled by a cutting jet valve 6 which is preferably provided with an oxygen resisting rubber facing 7 of generally conical form held in place as by the metallic actuating stud 63 within the hole or passage 21 in the connector member. When this valve is opened by being pushed backward against the action of its spring 4 loosely arranged within the recess 3 in the connector member the oxygen is admitted to the passage 20 and communicating conduit 37 mounted in the plug 61 at its rear end and soldered or otherwise secured at its forward end within the head so as to deliver this cutting oxygen through the passage 42 communicating with the cutting passage in the detchable tip which may be centrally located as is indicated in Fig. 1.

A desirable actuating device for operating this cutting valve may comprise an actuator rod 9 adapted to engage the actuating stud 63 on the valve and this actuating rod may extend through a packing 11 in the connector member which may be tightened from time to time by the packing plug 10 having a polygonal projecting end for this purpose, as is shown in Fig. 7. The forward end of this actuating rod may advantageously be formed with an enlarged guiding end 12 slidingly mounted within the recess 13 in the junction member so as to be controlled by an actuator, such as the rock arm or lever 16 pivoted as by the pin 15 in the actuator bracket 17 which may be detachably secured by the screws 18 to the junction member. This actuator lever may advantageously have a recessed or concave thumb piece actuator 14 in position to be conveniently engaged by the operator's thumb as he grasps the torch to guide and control its cutting jet and by merely holding the torch in the usual way this actuator is depressed so as to force the connected rock arm 16 backward and thereby force the actuator rod and cutting valve back to a sufficient extent to allow the free passage of the oxygen cutting jet to the work. The cleaning or replacement of this cutting valve may be readily effected by unscrewing the polygonal cap 5 which allows the valve and its spring to be removed and on replacing these parts a tight joint may be ensured by the action of the interposed packing 70.

The removable tip 44 may be readily secured in position on the torch head as by forming a recess in the head in which the tip fits and into which it may be strongly forced by the securing collar 46 having an inwardly projecting flange engaging a flange on the tip so as to force the tip upward when the collar is screwed up on the threaded end of the head. This tip may be formed with a central cutting passage 42 cooperating with the oxygen cutting passage in the head and receiving the cutting jet of oxygen therefrom and annular recesses or channels may be formed in the heating surfaces of the head or tip around this central passage to conduct the acetylene or other heating gas and the cooperating oxidizing gas for the heating jets from one to the other of these members. The annular recess 51 may be formed in position to communicate with the oxygen heating passage 43 in the head so that in any position of the replaceable tip oxygen is thus supplied to the injector 54 and delivered in a jet of the desired amount into the mixing passage 55 of the tip communicating with the annular or other mixing chamber 56 therein. The acetylene or other heating gas may be delivered into the channel 47 in the head from which one or more ports or passages 48 may lead communicating with the annular recess 50 in the tip. This recess may communicate with an injector chamber 52 through a series of holes or passages 53 so as to supply acetylene to this chamber and allow the relatively high pressure oxygen jet to draw it into the mixing passage and chamber and form the combustible heating mixture for heating the metal adjacent the cutting jet. For this purpose it is desirable to have a few heating conduits formed in the tip end and as shown in Figs. 1 and 8 this tip end 45 which may have threaded engagement with the tip may be formed with the two angularly arranged heating passages 57 having, if desired, reduced discharge ends closely adjacent the central cutting passage 58 so that the seam is heated by these high temperature heating jets and continuous operation of the cutting jet thereby ensured, two such heating passages being much less liable to clog and snap back as compared with a ring of heating conduits or passages all around the cutting jet. If desired an outer enclosing member or cylindrical casing 60 may be used to enclose the part of the tip body in which the injector chamber is formed and this may also project somewhat beyond the recessed meeting face of the tip in which the communicating recesses are formed so as to have a protecting action in connection therewith and guard against accidental bending or deformation.

This invention has been described in connection with a number of illustrative parts, proportions, arrangements, materials, methods of manufacture, assembly and use, to the details of which disclosure the invention is not of course to be limited, since what is claimed as new and what is desired to be secured by Letters Patent is set forth in the appended claim.

I claim:—

The blowpipe comprising a head and connected tubular handle, a connector member secured to said handle and provided with supply couplings and communicating regulating valves, a cutting jet valve mounted in a recess in said connector member and formed with an oxygen resisting rubber facing, an actuating stud holding said facing in position on said valve, a valve spring normally forcing said valve shut, an actuating rod adapted to engage said actuating stud and open said valve and formed with an enlarged guiding end, a removable actuator bracket secured to said handle and an actuator thumb piece pivoted to said bracket and having a rock arm cooperating with the guiding end of said actuator rod to force said cutting jet valve open when said thumb piece is held down adjacent said handle by the guiding grip of the operator.

WILLIAM L. HERRON.